United States Patent
Baek et al.

(10) Patent No.: US 7,910,655 B2
(45) Date of Patent: Mar. 22, 2011

(54) POLYARYLENE SULFIDE THERMOPLASTIC RESIN COMPOSITION

(75) Inventors: Nam Joong Baek, Gyeonggi-dong (KR); Han Soo Chung, Gyeonggi-dong (KR)

(73) Assignee: Cheil Industrial Inc., Gyungsangbuk-do (KR)

( * ) Notice: Subject to any disclaimer, the term of this patent is extended or adjusted under 35 U.S.C. 154(b) by 4 days.

(21) Appl. No.: 11/438,592

(22) Filed: May 22, 2006

(65) Prior Publication Data

US 2007/0123627 A1    May 31, 2007

Related U.S. Application Data

(63) Continuation-in-part of application No. PCT/KR2004/002609, filed on Oct. 13, 2004.

(30) Foreign Application Priority Data

Nov. 21, 2003 (KR) .................. 10-2003-0083009
Apr. 2, 2004 (KR) .................. 10-2004-0023108

(51) Int. Cl.
*C08L 23/02* (2006.01)
*C08L 51/06* (2006.01)
*C08L 63/00* (2006.01)
*C08L 81/02* (2006.01)

(52) U.S. Cl. .............. 525/65; 525/66; 525/85; 525/74; 525/80

(58) Field of Classification Search .............. 525/65, 525/66, 74, 80, 85
See application file for complete search history.

(56) References Cited

U.S. PATENT DOCUMENTS

| 4,985,175 | A | | 1/1991 | Dziuria et al. | |
|---|---|---|---|---|---|
| 5,605,962 | A | * | 2/1997 | Suzuki et al. | 525/70 |
| 5,684,088 | A | * | 11/1997 | Miyamori et al. | 525/64 |
| 5,990,225 | A | * | 11/1999 | Sagisaka et al. | 524/504 |
| 6,040,370 | A | * | 3/2000 | Wozny et al. | 524/394 |
| 6,303,686 | B1 | * | 10/2001 | Kitahara et al. | 524/546 |
| 2001/0007888 | A1 | * | 7/2001 | Asano | 524/115 |
| 2002/0132108 | A1 | * | 9/2002 | Ikegawa et al. | 428/323 |

FOREIGN PATENT DOCUMENTS

| EP | 431470 A2 | 6/1991 |
|---|---|---|
| JP | 58-154757 A | 9/1983 |
| JP | 59-207921 A | 11/1984 |
| JP | 62-172056 A | 7/1987 |
| JP | 1-306467 A | 12/1989 |
| JP | 5-295260 A | 11/1993 |
| JP | 9-263676 A | 10/1997 |
| KR | 93-8195 B1 | 8/1993 |

OTHER PUBLICATIONS

Ikeda, electronic translation of JP 05-295260 (Nov. 1993).*
Dainippon Ink, CAPLUS AN 1985:150377, abstracting JP 59207921 (1995).*
International Search Report issued in PCT/KR2004/002609 on Jan. 18, 2005.

* cited by examiner

*Primary Examiner* — Jeffrey C Mullis
(74) *Attorney, Agent, or Firm* — Maria Parrish Tungol

(57) ABSTRACT

A polymer composition includes a polyarylene sulfide resin, a olefinic graft copolymer, and a fluorinated polyolefin resin. Some embodiments may additionally comprise an epoxy compound and/or a filler. In some embodiments, the compositions have good flame retardancy, impact strength, and flexural strength.

15 Claims, No Drawings

POLYARYLENE SULFIDE THERMOPLASTIC RESIN COMPOSITION

CROSS-REFERENCE TO RELATED APPLICATIONS

This application is a continuation-in-part application under 35 U.S.C. §365 (c) claiming the benefit of the filing date of PCT Application No. PCT/KR2004/002609 designating the United States, filed Oct. 13, 2004. The PCT Application was published in English as WO 2005/049732 A1 on Jun. 2, 2005, and claims the benefit of the earlier filing date of Korean Patent Application No. 10-2004-0023108, filed Apr. 2, 2004 and Korean Patent Application No. 10-2003-0083009, filed Nov. 21, 2003. The contents of the PCT Application including its international publication, Korean Patent Application No. 10-2004-0023108, and Korean Patent Application No. 10-2003-0083009 are incorporated herein by reference in their entirety.

BACKGROUND

1. Field

The invention relates to compositions comprising polyarylene sulfide resins. More particularly, the invention relates to compositions comprising a polyarylene sulfide resin, an olefinic graft copolymer, and a fluorinated polyolefin resin.

2. Description of the Related Technology

Thermoplastic resins are used in electronic appliances, automobile devices, and chemical instruments. These thermoplastic resins are especially useful for those electronic applications which require high heat and chemical resistance. Polyarylene sulfide is one thermoplastic resins satisfying this demand because of its good heat resistance, dimensional stability, chemical resistance, flame retardancy and processability.

However, some polyarylene sulfide resins have poor impact resistance. In order to improve the impact resistance of polyarylene sulfide resin, methods of adding various elastomers to polyarylene sulfide resin have been proposed. For example, Japanese Patent Laid-Open No. 58-154757 discloses a method of adding an epoxy group-containing olefin copolymer to polyarylene sulfide resin. Japanese Patent Laid-Open No. 1-306467, discloses that a polyarylene sulfide composition may be prepared by incorporating a polyarylene sulfide, an epoxy group-containing olefin copolymer and an elastomer free from epoxy and acid anhydride groups. Japanese Patent Laid-Open No. 62-172056 discloses a polyarylene sulfide composition obtained by blending a polyarylene sulfide and an olefin copolymer graft copolymerized with unsaturated carboxylic acid, its anhydride or derivative thereof.

Therefore, a goal in this field is to provide a composition comprising a polyarylene sulfide resin with a good balance of properties including mechanical strength, processability, flame retardancy, and dimensional stability.

SUMMARY OF THE INVENTION

Described herein are polymer compositions. In some embodiments, the polymer compositions are thermoplastic polymer compositions. In some embodiments, the polymer compositions are thermoplastic polyarylene sulfide resin compositions.

In some embodiments, a composition comprises, in a mixture, a polyarylene sulfide resin, an olefinic graft copolymer. Some embodiments may additionally comprise a fluorinated polyolefin resin.

In some embodiments, the composition comprises the polyarylene sulfide resin from about 20 to about 99.4 parts by weight. In some embodiments, the composition comprises the olefinic graft copolymer resin from about 0.5 to about 10 parts by weight. In some embodiments, the composition comprises the fluorinated polyolefin resin from about 0.1 to about 10 parts by weight.

In some embodiments, the olefinic graft copolymer may comprise an olefin/vinyl copolymer moiety and a vinyl polymer moiety grafted on the olefin/vinyl copolymer moiety.

In some embodiments, the olefin/vinyl copolymer moiety may be a copolymer of an olefin monomer and a vinyl monomer. In some of these embodiments, the olefin monomer may be one or more selected from the group consisting of ethylene, propylene, and butylene. In some of these embodiments, the vinyl monomer may be one or more selected from the group consisting of vinyl acetate, glycidyl methacrylate, glycidyl acrylate, glycidyl ethacrylate, methyl(meth)acrylate, ethyl(meth)acrylate, butyl(meth)acrylate, and mixtures of one or more of methyl(meth)acrylate, ethyl(meth)acrylate, and butyl(meth)acrylate with maleic anhydride.

In some embodiments, the vinyl polymer moiety may comprise one or more selected from the group consisting of polymethyl methacrylate, polystyrene, and copolymer of styrene and a vinyl cyanide monomer.

In some embodiments, the olefinic graft copolymer moiety comprises poly(ethylene-glycidyl methacrylate)/poly(styrene-acrylonitrile).

In some embodiments, the fluorinated polyolefin resin comprises polytetrafluoroethylene.

In some embodiments, the polyarylene sulfide resin comprises at least about 70 molar % of a recurring unit represented by the following formula (I):

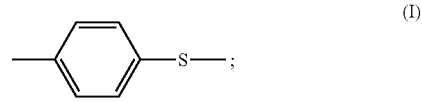

In certain embodiments, the polyarylene sulfide resin may have a melt index of about 10 to about 300 g/10 min under 2.16 kg load at 316° C.

In some embodiments, the polyarylene sulfide resin comprises less than about 50 molar % of one or more recurring units represented by the following formulas:

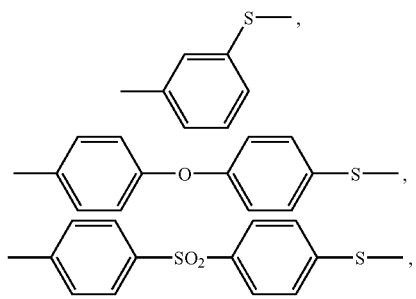

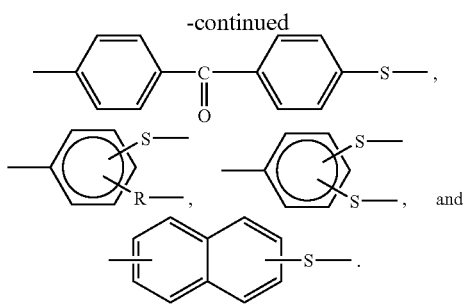

Some embodiments of the composition may additionally comprise an epoxy compound. In some embodiments, the epoxy compound comprises more than one epoxy groups. In other embodiments, the epoxy compound comprises less than four epoxy groups. In some embodiments, the composition comprises an epoxy compound represented by the following formula (II):

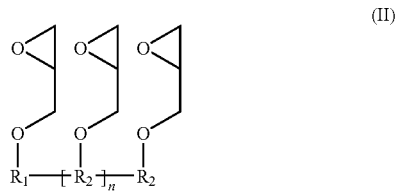

In some embodiments, $R_1$ and $R_2$ are independently $C_6$-$C_8$ aryl. In some embodiments, n is 0 or 1.

In some embodiments, the composition comprises up to about 3 parts by weight of the epoxy compound.

In some embodiments, the epoxy compound comprises at least one selected from the group consisting of polyglycidyl ether compounds, polyglycidyl amine epoxy compounds, bisphenol A type epoxy compounds, bisphenol F epoxy type compounds, resorcinol type epoxy compounds, tetrahydroxy bisphenol F type epoxy compounds, cresol novolak type epoxy compounds, phenol novolak type epoxy compounds, and cycloaliphatic epoxy compounds.

In some embodiments, the composition may additionally comprise filler. In some embodiments, the composition comprises up to about 70 parts by weight of a filler. In certain embodiments, the filler may comprise one or more selected from the group consisting of fibrous fillers and powdery fillers.

In some of these described embodiments, the composition may have flame retardancy of V-0 when a specimen of the composition is tested according to UL-94 VB flame retardant standards for a specimen thickness of 0.8 mm.

In some embodiments, the compositions may be formed in a molded article. In other embodiments, an electronic part comprises the composition as herein described.

DETAILED DESCRIPTION OF THE PREFERRED EMBODIMENT

As noted above, one aspect of this invention relates to a polymer composition. According to various embodiments, the polymer composition comprises a polyarylene sulfide resin, an olefinic graft copolymer, and a fluorinated polyolefin resin. Additionally, some embodiments also comprise an epoxy compound as described below. Further embodiments may also comprise a filler. Shaped articles comprising the polymer compositions of the embodiments show enhanced physical or mechanical properties as compared to other compositions less one or more components. The shaped articles of the embodiments also demonstrate improved flame retardancy and thermal stability over compositions less one or more components. As will be discussed, the shaped articles according to embodiments of the invention have one or more of good flame retardancy, impact strength, flexural strength, heat resistance, chemical resistance, and dimensional stability.

In embodiments, a composition comprises polyarylene sulfide resin and an olefinic graft copolymer. Further embodiments may also comprise a fluorinated polyolefin resin. In addition, some embodiments may also comprise an epoxy compound and/or a filler. In certain embodiments, the composition comprises about 20 to about 99.4 parts of a polyarylene sulfide resin, about 0.5 to about 10 parts of a olefinic graft copolymer. Additional embodiments may comprise about 0.1 to about 10 parts by weight of a fluorinated polyolefin resin. In certain embodiments, the composition additionally comprises up to about 3 parts by weight of an epoxy compound. The compositions may also comprise up to about 70 parts by weight of filler.

Polyarylene Sulfide Resin

In some embodiments, the polyarylene sulfide resin is a polymer resin comprising at least about 70 molar % of recurring units represented by the following structural formula (I):

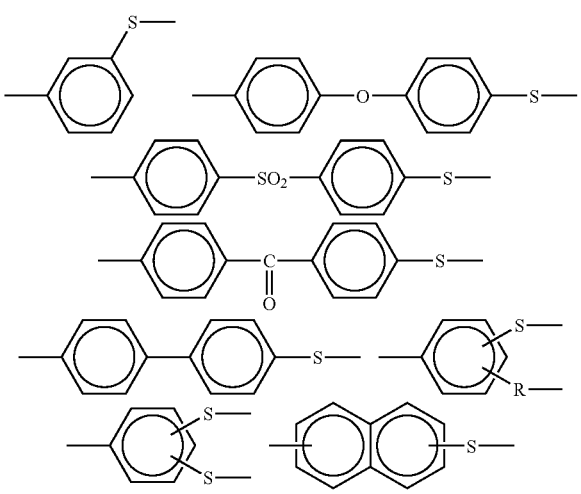

In some embodiments, the polyarylene sulfide resin comprises less than about 50 molar %, preferably less than about 30 molar % of other recurring units of the following structural formulas:

In embodiments, the polyarylene sulfide resin is one or more of a linear, branched or cross-linked polymer. In certain embodiments, the polyarylene sulfide resin comprises a polyphenylene sulfide resin. However, embodiments are not limited thereto as other polyarylene sulfide resins may comprise polynapthalene sulfide or polyanthracene recurring units.

In embodiments, the polyarylene sulfide resin formulations as herein described have a high degree of crystallization, sufficient heat- and chemical-resistance, and/or good impact strength. In embodiments, the melt index of the polyarylene sulfide resin ranges from about 10 to about 300 g/10 min under 2.16 kg load at 316° C. In some embodiments, this range may improve the heat stability and/or processability of the composition comprising the polyarylene sulfide resin.

One method of preparing cross-linked polyarylene sulfide resin is disclosed in Japanese publication No. 45-3368, which is herein incorporated by reference it is entirety. Another method of preparing linear polyarylene sulfide resin is disclosed in Japanese publication No. 52-12240, which is herein incorporated by reference in its entirety.

In some embodiments, the composition comprises about 20 to about 99.4 parts by weight of the polyarylene sulfide resin including, but not limited to, about 25, 30, 35, 40, 45, 50, 55, 60, 65, 70, 75, 80, 76, 78, 80, 85, 90, and 95 parts by weight, with reference to the other components added to the polymer composition. Still, other embodiments comprise up to about 20 parts by weight of the polyarylene sulfide resin including about 5, 10, 15, and 20, parts by weight of the polyarylene sulfide resin.

Olefinic Graft Copolymer

In some embodiments, the composition additionally comprises an olefinic graft copolymer. In certain embodiments, the olefinic graft copolymer comprises a olefin/vinyl copolymer moiety and a vinyl polymer moiety grafted to the copolymer moiety.

In some embodiments, the olefinic graft copolymer comprises about 40 to about 90 parts by weight of the olefin/vinyl copolymer moiety and about 10 to about 60 parts by weight of the vinyl polymer moiety which is grafted to the olefin/vinyl copolymer.

In some embodiments, the olefin/vinyl copolymer moiety is a polymer of an olefin monomer and a vinyl monomer. In some embodiments, the olefin/vinyl copolymer moiety comprises a polymer of from about 60 to about 100% by weight of an olefin monomer and up to about 40% by weight of a vinyl monomer. Examples of suitable olefin monomers include, but are not limited to, one or more of ethylene, propylene and butylene. In embodiments, the olefin monomer may comprise one or more olefin monomers. Examples of suitable vinyl monomers include, but are not limited to, one or more of vinyl acetate; vinyl monomers comprising epoxy groups such as glycidyl methacrylate, glycidyl acrylate, glycidyl ethacrylate, methyl(meth)acrylate, ethyl(meth)acrylate, butyl(meth)acrylate, and a mixture of maleic anhydride with one or more of methyl(meth)acrylate, ethyl(meth)acrylate, butyl(meth)acrylate. In embodiments, the vinyl monomer may comprise one or more vinyl monomers. In some embodiments, the vinyl monomer is one or more of methyl acrylate, a mixture of ethyl acrylate and maleic anhydride, vinyl acetate, and glycidyl methacrylate.

In some embodiments, the vinyl polymer moiety grafted to the olefin/vinyl copolymer moiety is one or more selected from polymethyl methacrylate, polystyrene, copolymer of styrene and a vinyl cyanide monomer. In some embodiments, the vinyl polymer moiety is a copolymer of styrene- and acrylonitrile (SAN).

In some embodiments, the olefinic graft copolymer comprises poly(ethylene-glycidyl methacrylate) with grafted poly(styrene-acrylonitrile). In other embodiments, the olefinic graft copolymer comprises poly(ethylene-glycidyl methacrylate) with grafted poly(styrene). In other embodiment, the olefinic graft copolymer comprises poly(ethylene-vinyl acetate) with grafted poly(styrene). As described above, the various monomers and copolymers can be mixed to provide the desired olefinic graft copolymer.

The compositions of various embodiments contain the olefinic graft copolymer in an amount to provide sufficient impact modification while maintaining good flame retardancy. In some embodiments, the composition comprises about 0.5 to about 10 parts by weight of the olefinic graft copolymer including, but not limited to, about 1, 1.5, 2, 2.5, 3, 3.5, 4, 4.5, 5, 5.5, 6, 6.5, 7, 7.5, 8, 8.5, 9, and 9.5 parts by weight, with reference to the other components added to the polymer composition.

Fluorinated Polyolefin Resin

In some embodiments, the composition may additionally comprise a fluorinated polyolefin resin. In some embodiments, the fluorinated polyolefin resin functions to form a fibrillar network when the composition is extruded. In some embodiments, the addition of the fluorinated resin results in decreased flow viscosity of the composition. In other embodiments, the fluorinated polyolefin resin functions to increase the shrinkage during combustion, thereby substantially reducing the dripping phenomena.

Examples of suitable fluorinated polyolefin resins include, but are not limited to, polytetrafluoroethylene, polyvinylidenefluoride, tetrafluoroethylene/vinylidenefluoride copolymer, tetrafluoroethylene/hexafluoropropylene copolymer, and ethylene/tetrafluoroethylene copolymer. In embodiments, the fluorinated polyolefin resin may comprise one or more fluorinated polyolefin resins.

In some embodiments, the fluorinated polyolefin resin comprises polytetrafluoroethylene. In some embodiments, the average particle size of the fluorinated polyolefin resin is about 0.05 to about 1,000 μm. In other embodiments, the density of the fluorinated polyolefin resin is about 1.2 to about 2.3 $g/cm^3$.

In some embodiments, the fluorinated polyolefin resin may be prepared by a conventional process. For example, the fluorinated polyolefin resin may be prepared in an aqueous solvent at 7 to 71 $kg/cm^2$ and 0 to 200° C. in the presence of a free radical forming catalyst such as sodium, potassium, or ammonium-peroxydisulphate. Other suitable fluorinated resins are available commercially include, but not limited to, the Teflon® product line available from DuPont.

In some embodiments, the fluorinated polyolefin resin is used as an emulsion or as a powder. In some embodiments, the fluorinated polyolefin resin is substantially uniformly dispersed in the composition mixture, although not limited thereto.

The compositions of various embodiments contain the fluorinated polyolefin resin in an amount to provide sufficient to have a substantially uniform dispersion in the mixture. In some embodiments, the composition comprises about 0.1 to about 10 parts by weight of the fluorinated polyolefin resin including, but not limited to, about 0.5, 1, 1.5, 2, 2.5, 3, 3.5, 4, 4.5, 5, 5.5, 6, 6.5, 7, 7.5, 8, 8.5, 9, and 9.5 parts by weight, with reference to the other components added to the polymer composition.

Epoxy Compound

Some embodiments of the compositions mixtures as described herein may additionally comprise one or more epoxy compounds. In some embodiments of the composition mixtures, the epoxy compounds comprise two or more epoxy groups. In some embodiments, the epoxy compounds are represented by the following formula (II):

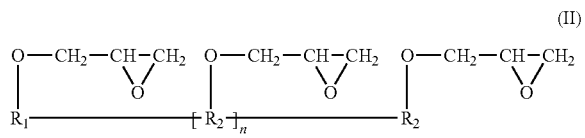

In the formula, $R_1$ and $R_2$ independently selected from $C_{6-8}$ aryl. In some embodiments, n is 0 or a natural number. In some embodiments, n is 0 or 1.

The compositions of various embodiments contain the epoxy compound with a certain number of epoxy groups in an amount to provide sufficient impact and mechanical strength while maintaining good flowability. In some embodiments, the epoxy compound comprises 2 to 4 epoxy groups. In other embodiments, the epoxy compound comprises 2 or 3 epoxy groups. In other embodiments, the epoxy compound comprises 1 to 3 epoxy groups.

Examples of epoxy compounds comprising two or more epoxy groups include, but are not limited to, polyglycidyl ether compounds, polyglycidyl amine epoxy compounds, bisphenol A type epoxy compounds, bisphenol F type epoxy compounds, resorcinol type epoxy compounds, tetrahydoxy bisphenol F type epoxy compounds, cresol novolak type epoxy compounds, phenol novolak type epoxy compounds, and cycloaliphatic epoxy compounds. In some embodiments, the epoxy compound comprises a bisphenol A type epoxy compound. In some embodiments, the epoxy compound comprises 3,4-epoxycyclohexylmethyl-3,4-epoxycyclohexane carboxylate. In other embodiments, the epoxy compound comprises vinylcyclohexene dioxide. In other embodiments, the epoxy compound comprises an o-cresylic novolak epoxy resin.

In some embodiments, the composition comprises up to about 3 parts by weight of the epoxy compound including, but not limited to, about 0.2, 0.4, 0.6, 0.8, 1, 1.2, 1.4, 1.6, 1.8, 2, 2.2, 2.4, 2.6, 2.8 and 3 parts by weight, with reference to the other components added to the polymer composition. Some embodiments may comprise amounts in excess of 3 parts by weight, including about 4, 5, 6, 7, 8, 9, and 10 parts by weight of the epoxy compound.

Filler

In some embodiments, the composition mixture additionally comprises filler. In some embodiments, the filler is one or more selected from fibrous fillers and powdery fillers. Examples of suitable fibrous fillers include, but are not limited to, glass fiber, carbon fiber, aramid fiber, potassium titanate fiber, silicon carbide fiber, or wollastonite. Examples of the powdery filler include, but are not limited to, calcium carbonate, silica, titanium oxide, carbon black, alumina, litium carbonate, iron oxide, molybdenum disulfide, graphite, glass beads, talc, clay mica, zirconium oxide, calcium silicate, and boron nitride.

In some embodiments, the composition comprises up to about 70 parts by weight of filler including, but not limited to, about 5, 10, 15, 20, 25, 30, 35, 40, 45, 50, 55, 60, 65, and 70 parts by weight, with reference to the other components added to the composition mixture. However, a few embodiments may also comprise more than about 70 parts by weight of filler, including about 75, 80 and 85 parts by weight.

Other Components

Composition mixtures may additionally comprise one or more other additives such as heat-stabilizers, antioxidants, release agents, ultraviolet absorbing agents, light stabilizers, flame retardants, lubricants, colorants such as dyes and pigments, and small amounts of various polymers. The compositions can contain one or more compounds or polymers in addition to the foregoing components. Additional components or additives may be added to provide additional properties or characteristics to the composition or to modify existing properties of the composition. One of ordinary skill in the art will appreciate that various additives may be added to the compositions according to some embodiments.

Preparation of Compositions

The compositions can be prepared by mixing components including a polyarylene sulfide resin, an olefinic graft copolymer, and fluorinated polyolefin resin. Some embodiments may additionally be mixed with one or more of the epoxy compound and the filler. In some embodiments, one or more other additives may be mixed together with the components of the composition. One or more component resins can be heated to melt prior to the mixing or the composition may be heated during the mixing. However, the mixing can occur when each components is in a solid, liquid, or dissolved state, or mixtures thereof. In one embodiment, the above components are mixed together all at once. Alternatively, one or more components are added individually. For example, the polyphenylene sulfide resin may first be mixed with the olefinic graft copolymer, prior to mixing this admixture with additional components. Formulating and mixing the components may be made by any method known to those persons having ordinary skill in the art, or those methods that may be later discovered. The mixing may occur in a pre-mixing state in a device such as a ribbon blender, followed by further mixing in a Henschel mixer, Banbury mixer, a single screw extruder, a twin screw extruder, a multi screw extruder, or a cokneader.

In embodiments, the polymer composition may be prepared by any known method. For example, the inventive composition may be prepared by mixing the components of the compositions and other additives at the same time and melt-extruding the mixture through an extruder so as to prepare pellets. The mixture may also be molded into a predetermined shape and cured to form a molded article.

Properties of the Compositions

An advantage of certain embodiments is to provide a flame retardant thermoplastic resin composition with good flame retardancy. Another advantage of some embodiments is to provide a flame retardant thermoplastic resin composition with good properties, such as flexural strength or impact strength.

Certain embodiments have flame retardancy of V-0 when a specimen of the composition is tested under the standard UL-94VB with 0.8 mm samples. Certain embodiments have flame retardancy of at least V-1 when a specimen of the composition is tested under the standard UL-94VB with 0.8 mm samples. These samples may be of the composition or of formed articles comprising the compositions.

Some embodiments comprising a polyarylene sulfide resin, an olefinic graft copolymer, a fluorinated polyolefin resin, an epoxy compound, and a filler have impact strength of at least about 10 kg·cm/cm, more preferably at least about 12 kg·cm/cm, and even more preferably at least about 13 kg·cm/cm, when a specimen of the composition is tested according to the standard ASTM D256 A (⅛" notched) at 23° C.

Another preferred feature of a shaped article comprising the composition in accordance with some embodiments is that it has flexuaral strength of at least about 1200 kg/cm², more preferably at least about 2000 kg/cm², and even more preferably at least about 2500 kg/cm², when a specimen of the composition is tested according to the standard ASTM D790.

Shaped Articles

A shaped article can be made using the composition according to the foregoing embodiments. In some embodiments, this article is molded into various shapes. An extrusion molding machine such as a vented extruder may be used. The polymer composition of embodiments may be molded into various moldings using, for example, a melt-molding device. In embodiments, the polymer composition is formed into a pellet, which then may be molded into various shapes using, for example, injection molding, injection compression molding, extrusion molding, blow molding, pressing, vacuum forming or foaming. In one embodiment, the polymer composition can be made into a pellet using melt-kneading, and the resulting pellets are molded into moldings through injection molding or injection compression molding.

As noted, in one embodiment, the polymer compositions are formed into pellets. In other embodiments, the polymer compositions are formed into structural parts of various consumer products, including electronic devices and appliances. In some embodiments, the polymer compositions are molded into a housing or body of electronic or non-electronic devices. Examples of electrical devices, in which a molded article made of the blend of the composition according to embodiments of the invention are used, include printers, computers, word processors, keyboards, personal digital assistants (PDA), telephones, mobile phones, cameras, facsimile machines, copy machines, electronic cash registers (ECR), desk-top electronic calculators, PDAs, cards, stationery holders, washing machines, refrigerators, vacuum cleaners, microwave ovens, lighting equipment, irons, TV, VTR, DVD players, video cameras, radio cassette recorders, tape recorders, mini disc players, CD players, speakers, liquid crystal displays, MP3 players, and electric or electronic parts and telecommunication equipment, such as connectors, relays, condensers, switches, printed circuit boards materials, coil bobbins, semiconductor sealing materials, electric wires, cables, transformers, deflecting yokes, distribution boards, clocks, watches, and the like.

In other embodiments, the compositions may be applied to various processes for molding. In some embodiments, the composition may be used as a substitute materials for Mg or Al die casting, electric or electronic parts, or precision parts.

Another embodiment provides an electronic device which includes a housing or a part, which is made of a polymer composition comprising a composition as herein described. Some embodiments provide a method of making an electronic device, comprising providing an electrical circuit, providing a housing comprising a portion, and enclosing at least part of the electrical circuit with the housing, wherein the portion comprises embodiments of the composition as herein described.

The invention is further described in terms of the following examples which are intended for the purpose of illustration and not to be construed as in any way limiting the scope of the present invention, which is defined by the claims. In the following examples, all parts and percentage are by weight unless otherwise indicated.

EXAMPLES

Preparation of the components of the compositions of Examples 1-4 and Comparative Examples 1-4 were as follows:

(A) Polyarylene Sulfide Resin

A polyarylene sulfide resin (PPS), available from DIC Co. of Japan was used. This resin had a melt index (MI) of 50 to 100 g/10 min at 316° C. under 2.16 kg load.

(B) Olefinic Graft Copolymer

A olefinic graft copolymer, available from Nippon Oil Fats Co. as Modiper A4400 (product name), was used.

(C) Fluorinated Polyolefin Resin

A fluorinated polyolefin resin, available from the DuPont Company as Teflon® 7AJ, was used.

(D) Epoxy Compound ($d_1$) An epoxy compound comprising two epoxy groups, available from Union Carbide as ERL-4221 (product name), was used.

($d_2$) An epoxy compound comprising three epoxy groups, available from Nippon Kayaku Co. as EOCN-104S (product name), was used.

(E) Filler

Glass fiber manufactured by Korea Owens Corning Company having a filament diameter of 13 μm and a chopped length of 3 mm was used. The glass fiber was treated with amino silane and methacryloxy silane as coupling agents. Lubricant and sizing agent was also used.

Examples 1-4

The components as shown in Table 1, along with an antioxidant and a heat stabilizer, were added in a conventional mixer. The mixture was then extruded through a twin screw extruder with L/D=36 and Φ=45 mm to prepare a product in pellet form. The produced pellet was molded into test specimens using a 10 oz injection molding machine at 320° C. Flame retardancy, flexural modulus, and notch-Izod impact strength of the test specimens were measured.

Comparative Examples 1-4

Comparative Examples 1-4 were conducted in the same manner as Examples 1-4 except that the amount of each component was altered.

TABLE 1

| | Examples | | | | Comparative Examples | | | |
|---|---|---|---|---|---|---|---|---|
| | 1 | 2 | 3 | 4 | 1 | 2 | 3 | 4 |
| (A) Polyarylene Sulfide | 94 | 53 | 53 | 49 | 95 | 54 | 54 | 43 |
| (B) Olefinic Graft Copolymer | 5 | 5 | 5 | 5 | 5 | 5 | 5 | 15 |
| (C) Fluorinated Polyolefin Resin | 1 | 1 | 1 | 5 | — | — | — | 1 |
| (D) Epoxy Compound ($d_1$) | — | 1 | — | — | — | 1 | — | — |
| ($d_2$) | — | — | 1 | 1 | — | — | 1 | 1 |
| (E) Filler | — | 40 | 40 | 40 | — | 40 | 40 | 40 |

The specimens of Examples 1-4 and Comparative Examples 1-4 were maintained at 23° C. and a relative humidity of 50% for 48 hours, followed by the measurement of their physical properties in the following manner:

(1) Flame retardancy: the flame retardancy was measured in accordance with UL94 VB with a thickness of 0.8 mm.

(2) Flexural strength: the flexural strength was measured in accordance with ASTM D790.

(3) Impact strength: The notch Izod impact strength was measured in accordance with ASTM D256 (⅛" notched).

The test results are shown in Table 2:

TABLE 2

|  | Examples | | | | Comparative Examples | | | |
| --- | --- | --- | --- | --- | --- | --- | --- | --- |
|  | 1 | 2 | 3 | 4 | 1 | 2 | 3 | 4 |
| UL94 flame retardancy (0.8 mm) | V-0 | V-0 | V-0 | V-0 | V-1 | V-1 | V-1 | V-1 |
| Flexural strength (kg/cm²) | 1300 | 2450 | 2500 | 2500 | 1300 | 2450 | 2500 | 2200 |
| Notch Izod impact strength (kg cm/cm) | 2 | 12 | 13 | 13 | 2 | 12 | 13 | 11 |

As shown in Table 2, the composition of Example 1 employing a polyarylene sulfide resin, an olefinic graft copolymer, and fluorinated polyolefin resin demonstrated good flame retardancy as compared to Comparative Example 1. In addition, compositions of Examples 2-4 which further contained an epoxy compound and a filler demonstrated improved mechanical properties, as well as improved flame retardancy.

The skilled artisan will recognize the interchangeability of various features from different embodiments. Similarly, the various features and steps discussed above, as well as other known equivalents for each such feature or step, can be mixed and matched by one of ordinary skill in this art to perform compositions or methods in accordance with principles described herein. Although the invention has been disclosed in the context of certain embodiments and examples, it will be understood by those skilled in the art that the invention extends beyond the specifically disclosed embodiments to other alternative embodiments and/or uses and obvious modifications and equivalents thereof. Accordingly, the invention is not intended to be limited by the specific disclosures of embodiments herein. Rather, the scope of the present invention is to be interpreted with reference to the claims that follow.

What is claimed is:

1. A composition comprising in a mixture:
a polyarylene sulfide resin;
an olefinic graft copolymer comprising 40~90 parts by weight of an olefin/vinyl copolymer moiety and 10~60 parts by weight of a vinyl polymer moiety grafted on the olefin/vinyl copolymer moiety wherein the olefin/vinyl copolymer comprises 60~100% by weight of an olefin monomer and up to 40% by weight of a vinyl monomer;
a fluorinated polyolefin resin, and
a cycloaliphatic epoxy compound represented by the following formula (II):

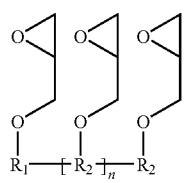

(II)

wherein R1 and R2 are independently C6-C8 aryl; and n is 0 or 1,
wherein the polyarylene sulfide resin present in an amount of from about 20 to about 99.4 parts by weight based on total 100 parts by weight of the composition, the olefinic graft copolymer resin in an amount of from about 0.5 to about 10 parts by weight based on total 100 parts by weight of the composition, the fluorinated polyolefin resin is present in an amount of from about 0.1 to about 10 parts by weight based on total 100 parts by weight of the composition and the composition comprises up to about 3 parts by weight of the cycloaliphatic epoxy compound based on total 100 parts by weight of the composition.

2. The composition of claim 1, wherein the olefin monomer is one or more selected from the group consisting of ethylene, propylene, and butylene.

3. The composition of claim 1, wherein the vinyl monomer is one or more selected from the group consisting of vinyl acetate, glycidyl methacrylate, glycidyl acrylate, glycidyl ethacrylate, methyl (meth)acrylate, ethyl (meth)acrylate, butyl (meth)acrylate, and mixtures of one or more of methyl (meth)acrylate, ethyl (meth)acrylate, and butyl (meth)acrylate with maleic anhydride.

4. The composition of claim 1, wherein the vinyl polymer moiety comprises one or more selected from the group consisting of polymethyl methacrylate, polystyrene, and copolymer of styrene and a vinyl cyanide monomer.

5. The composition of claim 1, wherein the olefinic graft copolymer comprises poly(ethylene-glycidyl methacrylate)/poly(styrene-acrylonitrile).

6. The composition of claim 1, wherein the fluorinated polyolefin resin comprises polytetrafluoroethylene.

7. The composition of claim 1, wherein the polyarylene sulfide resin comprises at least about 70 molar % of a recurring unit represented by the following formula (I):

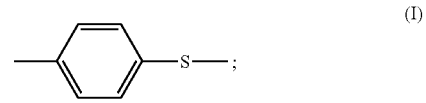

(I)

wherein the polyarylene sulfide resin has a melt index of about 10 to about 300 g/10 min under 2.16 kg load at 316° C.

8. The composition of claim 1, wherein the polyarylene sulfide resin comprises less than about 50 molar % of one or more recurring units represented by the following formulas:

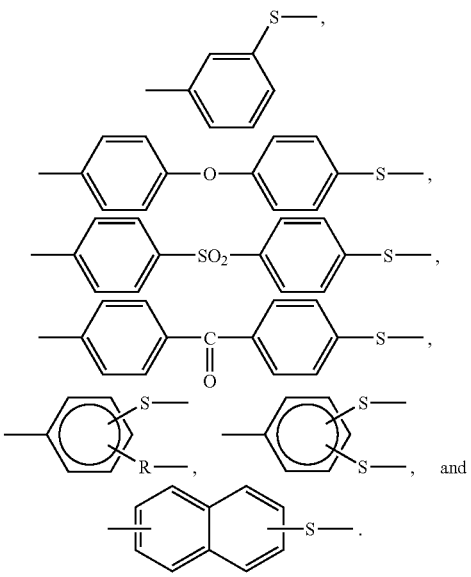

9. The composition of claim 1, wherein the epoxy compound comprises at least one selected from the group consisting of polyglycidyl ether compounds, polyglycidyl amine epoxy compounds, bisphenol A type epoxy compounds, bisphenol F epoxy type compounds, resorcinol type epoxy compounds, tetrahydroxy bisphenol F type epoxy compounds, cresol novolak type epoxy compounds, phenol novolak type epoxy compounds, and cycloaliphatic epoxy compounds.

10. The composition of claim 1, further comprising up to about 70 parts by weight of a filler.

11. The composition of claim 10, wherein the filler comprises one or more selected from the group consisting of fibrous fillers and powdery fillers.

12. The composition of claim 1, wherein the composition has flame retardancy of V-0 when a specimen of the composition is tested according to UL-94 VB flame retardant standards for a specimen thickness of 0.8 mm.

13. A molded article formed from the composition of claim 1.

14. An electronic part, comprising the composition of claim 1.

15. The composition of claim 1 wherein the amount of olefin grail copolymer is from about 5 to about 10 parts by weight based on total 100 parts by weight of the composition.

* * * * *